(12) United States Patent
Timmons

(10) Patent No.: US 8,399,138 B2
(45) Date of Patent: Mar. 19, 2013

(54) LIQUID RECHARGEABLE LITHIUM ION BATTERY

(75) Inventor: Adam T Timmons, Royal Oak, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 644 days.

(21) Appl. No.: 12/578,813

(22) Filed: Oct. 14, 2009

(65) Prior Publication Data

US 2011/0086249 A1  Apr. 14, 2011

(51) Int. Cl.
*H01M 8/06* (2006.01)
*H01M 8/04* (2006.01)
*H01M 4/58* (2010.01)
*H01M 6/18* (2006.01)

(52) U.S. Cl. .............. 429/408; 429/447; 429/231.95; 429/322

(58) Field of Classification Search .............. 429/408, 429/447, 231.95, 322
See application file for complete search history.

(56) References Cited

U.S. PATENT DOCUMENTS

| | | |
|---|---|---|
| 2008/0079397 A1 | 4/2008 | Fee et al. |
| 2009/0305145 A1 | 12/2009 | Kim et al. |
| 2009/0311592 A1 | 12/2009 | You et al. |
| 2010/0323264 A1* | 12/2010 | Chiang et al. .............. 429/449 |

* cited by examiner

*Primary Examiner* — Helen O Conley
(74) *Attorney, Agent, or Firm* — BrooksGroup

(57) ABSTRACT

One embodiment includes a method for recharging a lithium ion battery, including providing a lithium ion battery comprising used liquid electrode material; removing said used liquid electrode material from said lithium ion battery; and, introducing a relatively unused liquid electrode material into the lithium ion battery to replace the used liquid electrode material.

20 Claims, 3 Drawing Sheets

LIQUID RECHARGEABLE LITHIUM ION BATTERY

TECHNICAL FIELD

The field to which the disclosure relates to lithium ion batteries.

BACKGROUND

Lithium ion batteries are a type of rechargeable battery in which a lithium ion moves between a negative electrode and a positive electrode. Lithium ion batteries are commonly used in consumer electronics. In addition to uses for consumer electronics, lithium-ion batteries are growing in popularity for defense, automotive, and aerospace applications due to their high energy density.

SUMMARY OF EXEMPLARY EMBODIMENTS OF THE INVENTION

One exemplary embodiment includes a method for recharging a lithium ion battery, including providing a lithium ion battery comprising used liquid electrode material; removing said used liquid electrode material from said lithium ion battery; and, introducing a relatively unused liquid electrode material into the lithium ion battery to replace the used liquid electrode material.

Other exemplary embodiments will become apparent from the detailed description provided hereinafter. It should be understood that the detailed description and specific examples, while disclosing exemplary embodiments, are intended for purposes of illustration only and are not intended to limit the scope of the invention.

BRIEF DESCRIPTION OF THE DRAWINGS

The following description of the embodiment(s) is merely exemplary (illustrative) in nature and is in no way intended to limit the invention, its application, or uses.

DETAILED DESCRIPTION OF EXEMPLARY EMBODIMENTS

The following description of the embodiment(s) is merely exemplary (illustrative) in nature and is in no way intended to limit the invention, its application, or uses.

In an exemplary embodiment a lithium ion battery (cell) having a liquid electrode material is provided where the liquid electrode may act as either the negative or positive electrode and where the liquid electrode material may be removed and replaced to recharge the battery.

In one embodiment, the liquid electrode material is substantially in a liquid state at or about room temperature (e.g., about 21° C.). In some embodiments, the liquid electrode material is substantially in a liquid state at temperatures within about 10 degrees of room temperature. In other embodiments, the liquid electrode material is substantially in a liquid state at temperatures within about 20 degrees of room temperature. In other embodiments, the liquid electrode material is substantially in a liquid state at temperatures within about 50 degrees of room temperature.

In some embodiments, the liquid electrode material may include any known salts of lithium such as one or more of $LiPF_6$, $LiBF_4$, and $LiClO_4$. In some embodiments the liquid electrode may include one or more solvents such as, but not limited to, ethylene carbonate, propylene carbonate or dimethyl carbonate.

In other embodiments, the liquid electrode material may a solid that may be heated to form a liquid electrode material prior to being replaced in the lithium ion battery. In one embodiment the electrode material may require heating e.g., from about 1 to about 50° C. to form a liquid prior to replacement in a lithium ion battery in a recharging or servicing process. It will be appreciated that the melting temperature of the electrode material may change depending on the degree of lithiation or delithiation.

In one embodiment, a lithium ion battery cell may include a negative electrode of solid state lithium-containing material, such as a lithium or lithium alloy plate which may be separated from the liquid positive electrode material by a solid electrolyte material or a gel electrolyte material.

In another embodiment, a lithium ion battery cell may include a positive electrode of solid state lithium-reactive material, such as a lithium-transition metal-anion where the anion may be but is not limited to $PO_4$, $SiO_4$, O or F, which may be separated from the liquid negative electrode material by a solid electrolyte material or a gel electrolyte material.

In some embodiments the solid electrolyte material (separator) or gel electrolyte material may be any material known in the art including polymer composites e.g., including polymers such as polyethyleneoxide (PEO) or polyacrylonitrile and lithium salts such as one or more of $LiPF_6$, $LiBF_4$, $LiClO_4$, LiSICON, or LiPON, as well as fillers.

Figure 1:
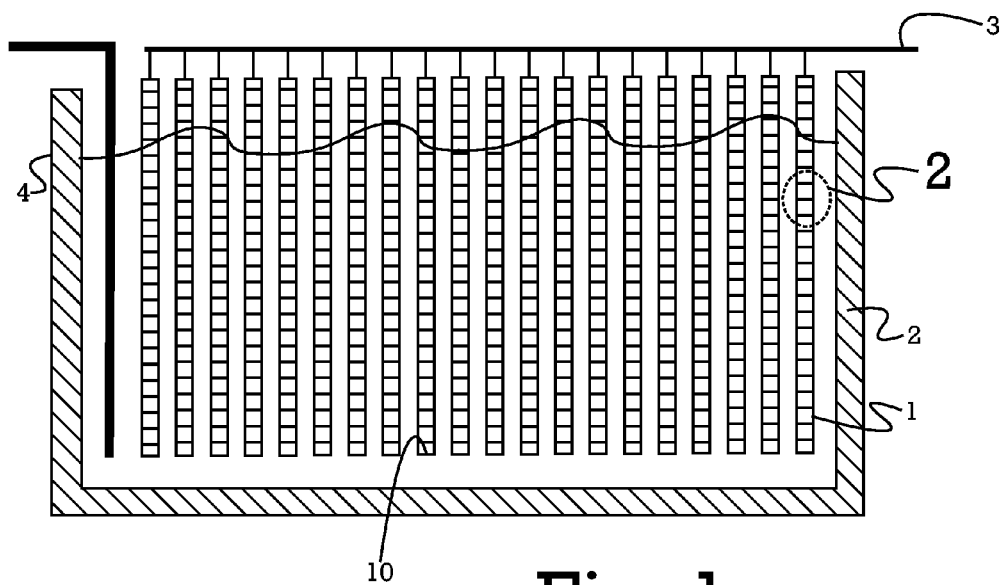
FIG. 1 is a sectional schematic illustration of a rechargeable lithium ion battery according to one embodiment.
Figure 2:
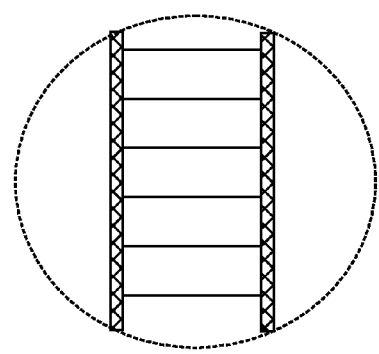
FIG. 2 is an enlarged portion view of a lithium metal plate of the rechargeable lithium ion battery of FIG. 1.

Referring now to FIGS. 1-2, one embodiment may include a liquid rechargeable lithium ion battery including a plurality of spaced apart lithium metal plates 1 (negative terminal) received in a liquid electrode and plate array holding tank 2 (positive terminal), an inverted electrical connector 3 connected to other lithium metal plates, a metal rod 4 submerged in a liquid electrode 5 that essentially fills the tank. As shown in FIG. 2 the electrolyte layer is very thin, for example, a few microns to prevent electron transfer but allows lithium ion transfer. Material for the electrolyte may include, but are not limited to, lithium super-ion conductor or lithium phosphorusoxynitride. The lithium metal plates would be depleted with every use of the liquid electrode. While the used liquid electrode would be pumped out of the tank before the new liquid electrode is pumped into the tank (having been rejuvenated at a pumping station or elsewhere) there should be enough lithium on board the plate to last in one example for 2000-5000 miles of vehicle driving. At that time, like an oil change, new plates could be installed.

Figure 3:
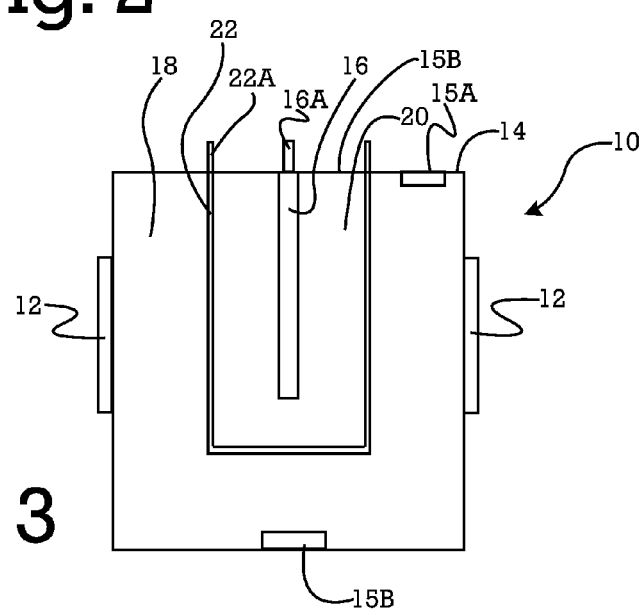
FIG. 3 is a perspective view of a lithium ion battery in accordance with an exemplary embodiment.

For example, referring to FIG. 3, in one embodiment, the lithium ion battery 10 may include a battery container 14 which may include a solid state lithium containing plate 16 which may be separated from liquid electrode material 18 by a solid electrolyte material or a gel electrolyte material 20. A current collector 22 of a conductor material will be 20 in contact with the liquid electrode material 18. Positive and negative terminal electrical leads e.g., 22A and 16A may extend outside the container 14 for further connection to an external circuit An electrical connection must be made with the material in the plates but not permit a short circuit with the electrode liquid material.

In one embodiment, the battery cell container e.g., 14 may include a formable (moldable) plastic material. In another embodiment, the battery cell container may be formed of a laminate material including metal foil e.g., outer layers of plastic with an inner layer of aluminum foil as is known in the art where the container may be either rigid or flexible and may be impervious to the external atmosphere including water vapor. The battery container e.g., 14 may further include one or more sealed accessible openings e.g., 15A, 15B, such as a quick connect fittings allowing access to the liquid electrode material. The container e.g., 14 may include a removable access cover e.g., 15C which may be disposed adjacent the solid state lithium containing plate and/or the solid state liquid electrode material or a gel liquid electrode material to allow access to and replacement of the respective solid state lithium containing plate and solid or gel liquid electrode material.

Figure 4A:
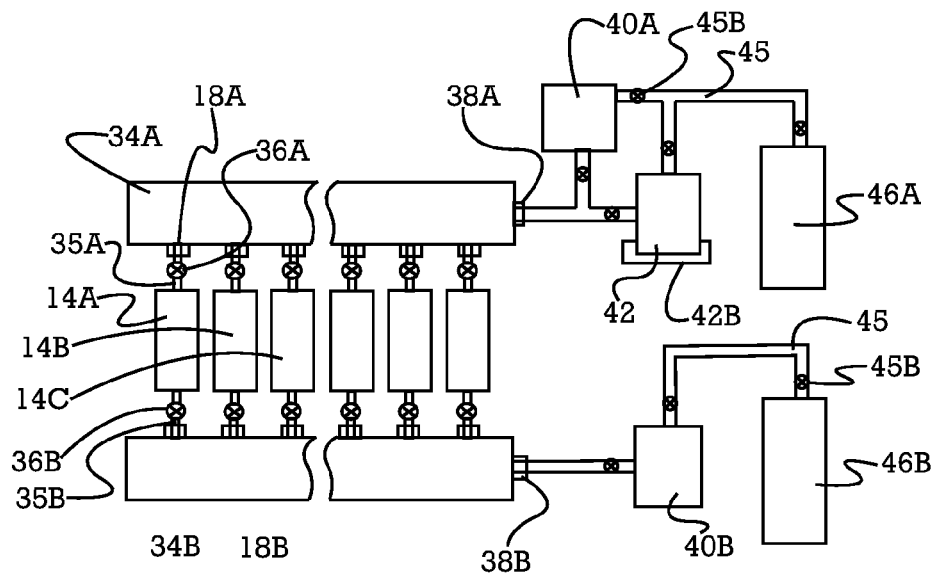
FIG. 4A is a side view of a manifold and pump configuration that may be used in recharging one or more lithium ion batteries according to an exemplary embodiment.

Referring to FIG. 4A, in one embodiment, a plurality of individual lithium batteries (cells), e.g., 14A, 14B, 14C, such as that shown in FIG. 1, may be provided stacked together in a bank of battery cells, e.g. where the batteries are connected in series as is known in the art, and where the number of individual battery cells may be from about 2 to about 500. Alternatively, a single tank (cell) may be utilized.

In one embodiment, the bank of batteries may include one or more common manifolds, e.g., 34A, 34B positioned above and/or below the bank of batteries, and where each of the individual batteries may include one or more valves, e.g., 36A, 36B where valve 36A is a fill valve and valve 36B is a drain valve, and which may be commonly and or automatically controlled. In one embodiment, a drain valve e.g., 36B may be included in a bottom portion of each of the batteries (cells), where the drain valves may be individually or simultaneously opened to drain liquid electrode material from each of the batteries into the lower manifold 34B, e.g., by the force of gravity. In other embodiments, each of the drain valves may be automatically controlled e.g., by a controller.

In other embodiments, the manifolds 34A, 34B may be attached to the bank of batteries during a battery recharging/servicing operation, where respective conduits 35A, 35B, and valves 36A, 36B are part of the respective manifolds and are inserted into the respective battery cells in a quick connect manner, e.g., at quick connect fitting 15A, shown in FIG. 3.

In another embodiment, each individual battery cell may include one or more conduits e.g., 35A, 35B, which may include valves e.g., 36A, 36B, permanently attached to the individual battery cell while maintaining the battery cell and liquid electrode material isolated from the external atmosphere when the valves are in a closed position. In some embodiments, the conduits 35A, 35B, may be made of a laminated foil and plastic material, similar to the battery container 14 describe above.

In another embodiment, the respective manifolds, e.g., 34A, 34B, may have one or more main access openings e.g., openings 38A, 38B, which are normally closed and airtight, but which may be accessed by penetration of a pump conduit into the access opening, e.g., by a quick connect fitting as is known in the art to allow access to a respective manifold to allow supply of liquid including liquid electrode material (e.g., to fluid-in manifold 34A) as well as access to drained liquid electrode material (from fluid-out manifold 34B), which may be further drained or pumped out as further explained below.

In one embodiment, the lithium ion battery cells may be recharged (restored to a predetermined state of charge (SOC) or battery capacity) by removing used liquid electrode material from the battery cell and replacing the used liquid state electrode material with relatively unused or rejuvenated liquid electrode material including recycled material, e.g., where lithium has been removed from liquid positive material or where lithium has been replenished in the negative material.

In some embodiments, the removed and used liquid state electrode material (e.g., positive electrode) may be recycled by subjecting the used material to a chemical or electrochemical process to de-lithlate (substantially remove lithium) from the liquid state electrode material to recycle it.

In some embodiments the electrolyte material, e.g., 20, which may be a solid or gel may further be removed and replaced in a battery servicing process and may be subsequently de-lithiated to recycle the electrolyte material and/or recover the lithium for re-use.

In some embodiments the solid state lithium-containing electrode e.g., 16, (positive or negative electrode), may further be removed and replaced in a battery servicing process and may be subsequently recycled for re-use. It will be appreciated that an advantage of removing a used lithium-metal electrode, e.g. negative electrode and replacing it in a battery recharging or battery servicing process is that lithium dendrite formation by the re-plating of lithium onto itself will be avoided, as compared to a conventional lithium battery recharging process.

In some embodiments, the electrode material may be heated in order to melt electrode material that has become solid or semi-solid to liquefy the electrode material prior to removal and replacement with fresh liquid electrode material. In some embodiments, the electrode material may be heated by the addition of heated solvents to contact the electrode material. In some embodiments carbonate solvents may be used such as ethylene carbonate, diethyl carbonate, ethyl carbonate, methyl carbonate, propylene carbonate, dimethyl carbonate, and mixtures thereof.

In other embodiments, the individual battery cells may include a resistive heating elements e.g., 12 (FIG. 1) within and/or on the outside of the battery cell to allow heating in order to melt electrode material that may have become solid or semi-solid prior to removal and replacement with fresh liquid electrode material In an exemplary embodiment, referring to FIG. 4A, one or more individual battery cells e.g., 14A, 14B, 14C are shown placed proximate a respective manifold e.g., fill (fluid-in) manifold 34A and drain (fluid-out) manifold 34B including and each of the at least two conduits e.g. 35A and 35B, associated with a respective battery cell are sealably connected (e.g., substantially air tight) to a respective input e.g., 18A, 18B of the respective manifolds 34A and 34B to provide sealable communication (e.g., impervious to external air) with the manifolds to provide flow of an liquid electrode material from a respective manifold into and/or out of respective battery cells e.g., 14A, 14B, 14C.

In an exemplary embodiment, the respective manifolds 34A and 34B may be provided together with the respective battery cells, e.g., 14A, and conduits 35A, 35B, as a one piece structure, e.g., whereby the respective conduits are molded-in (sealably connected) to a respective manifold during the battery cell and/or manifold manufacturing process. It will be appreciated that the respective manifolds may vary in size depending on the number of battery cells desired to be serviced at one time. For example, the respective manifolds may be sized such that the number of battery cells that may be serviced at one time, including the battery recharging process discussed below, e.g., in some embodiments from about 10 to about 500, in other embodiments, from about 100 to about 300.

In another exemplary embodiment, the respective manifolds 34A and 34B may be provided as smaller manifold modules sealably connected together with the ability to service a selected number of respective battery cells (e.g., provided with associated battery cell conduit inputs) or provided with pre-molded sealably connected conduits. Each of the manifold modules may the be further sealably connected to another manifold module e.g., at a major manifold module input/out as discussed below in order to carry out a battery cell recharge process. For example, a particular manifold module may be sized with respective battery cell conduit inputs/outputs where the number of battery cells that may be conveniently serviced at one time by the respective manifold modules may be from about 5 to about 100, in other embodiments, from about 10 to about 50.

In another exemplary embodiment, the respective manifolds 34A and 34B may be attached and/or detached from the respective battery cell conduits e.g., 35A and 35B in a separate process, for example as part of a battery cell recharge process as further explained below.

Figure 4B:
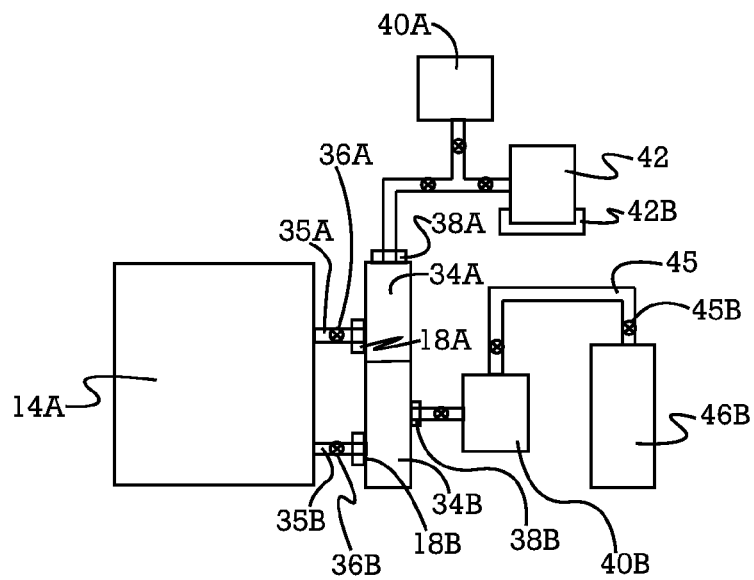
FIG. 4B is a front view of a manifold and pump configuration that may be used in recharging one or more lithium ion batteries according to an exemplary embodiment.

Referring to FIG. 4B, showing a front view of a plurality of battery cells where only a single battery cell e.g., 14A may be visible, in another exemplary embodiment, the respective manifolds e.g., fill manifold 34A and drain manifold 34B may be stacked on top of one another or formed as a single structure with manifold portions 34A and 34B sealably isolated from one another and where each manifold communicates with a respective conduit e.g., 35A and 35B.

Referring to FIGS. 4A and 4B in an exemplary embodiment the conduits 35A and 35B are attached to respective sealable manifold inputs 18A and 18B that may be made of a material that can readily be sealably attached to the conduits e.g., impervious to external air. For example, in one exemplary embodiment the respective manifolds 34A and 34B, or at least the respective sealable inputs 18A and 18B portions may be made of the same material as the conduits 35A and 35B whereby the conduits are sealably attached e.g., by quick disconnect fittings or by welding or melting (thermally fusing) a respective conduit, 35A and 35B, to a respective sealable input, 18A and 18B.

In another embodiment, each of the manifolds 34A and 34B may include at least one main input/output plug e.g., 38A, 38B for sealably attaching pump conduits to enable the introduction and/or extraction of liquid electrode material to and/or from a respective manifold 34A and 34B.

In another embodiment, two-way flow valves e.g., 36A, 36B may be included between a respective manifold and a battery cell, for example, at least between a respective battery cell and a fill (fluid-in) manifold. The two-way valves may be molded into one or more of the conduits associated with an individual battery cell or may be molded into one or both of the respective manifolds 34A, 34B. In some embodiments, the flow valves e.g., 36A, 36B, allow for different liquid electrode materials to be selectively introduced and/or removed from a respective battery cell connected to a respective manifold.

In an exemplary lithium ion battery recharge method, one or more fresh liquid electrode material sources e.g., 40A, and one or more solvent sources e.g., 42 (including optional heating device 42B) are sealably connected to the fill manifold 34A, e.g., via main manifold input 38A. One or more used liquid electrode material containers 40B may be sealably connected to the drain manifold 34B, e.g., via main manifold output 38B. The drain manifold 34B and/or used liquid electrode material container 40B may further be connected to a vacuum (e.g., negative pressure source 46B to drive flow of the liquid electrode material into and/or out of the respective battery cells and manifolds. The fill (fluid-in) manifold 34A and/or solvent source 42 and/or fresh liquid electrode material source 40A may optionally be connected to a positive pressure source (e.g., positive pressure source 46A to assist in driving flow of fresh liquid electrode material and/or solvent into and/or out of the respective battery cells e.g., 14A, 14B, 14C, and manifolds 34A and 34B. Respective conduits e.g., 45 and valves 45B may be included to connect and control the flow of the various fluids.

A shown in FIG. 4B, it will be appreciated that only one of a negative pressures source 46B (or a positive pressure source) may be included to operate the flow of liquid electrode materials into and/or out of the respective manifolds e.g., 34A, 34B, and battery cells e.g., 14A, 14B, 14C.

Figure 5:
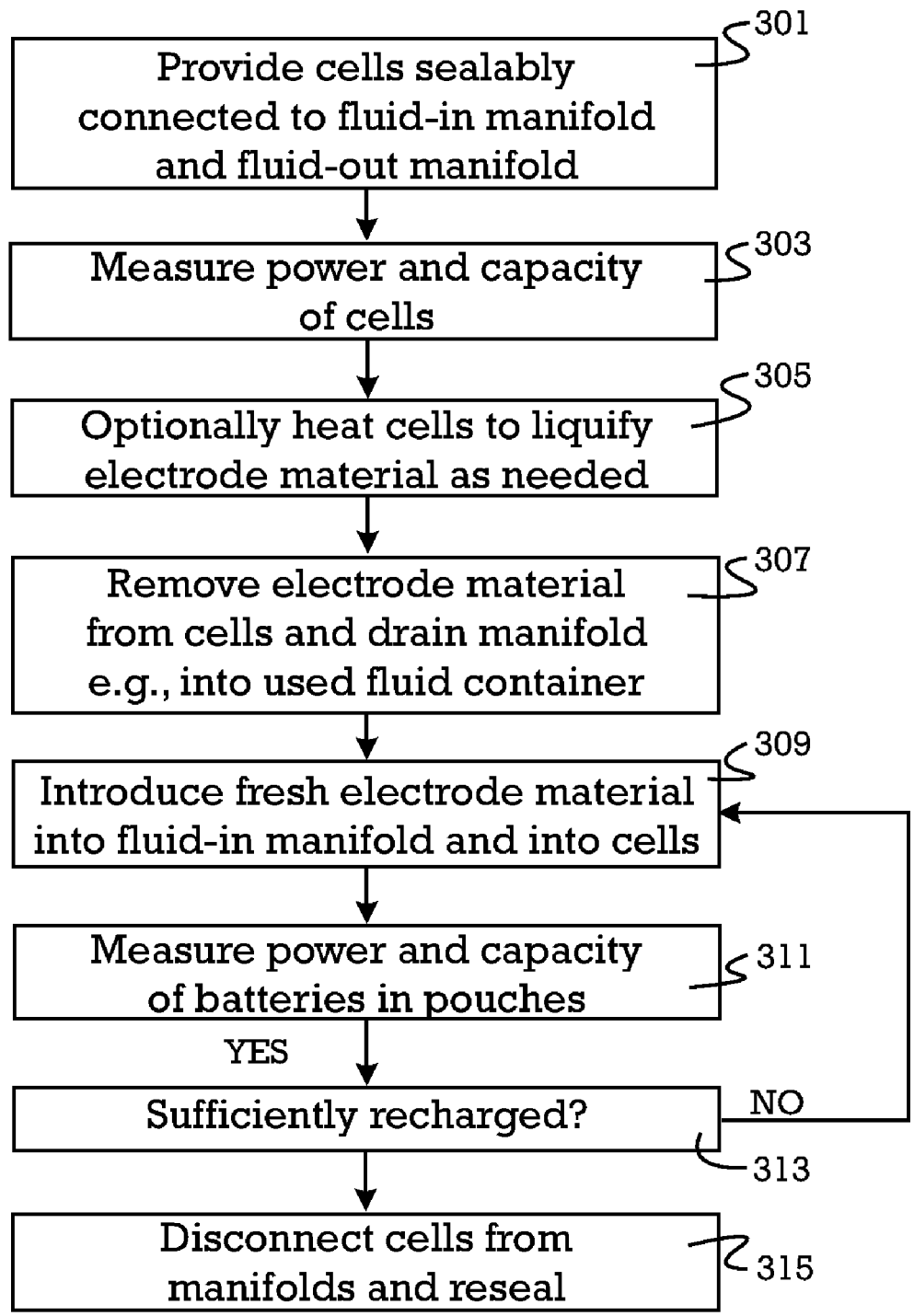
FIG. 5 illustrates a logic flow diagram for recharging a lithium ion battery according to an exemplary embodiment.

Referring to FIG. 5, in an exemplary process flow of an exemplary battery recharging method using the battery cells and manifolds as outlined above, in step 301 one or more battery cells e.g., 14A, 14B, 14C, are provided sealably connected (e.g., substantially air tight to ensure a water-vapor free and oxygen-free environment) to a respective fill (fluid-in) manifold e.g., 34A and a respective drain (fluid-out) manifold e.g., 34B such as shown in FIGS. 2A and 2B.

In step 303, the power and capacity (state of electric charge) of respective individual lithium ion batteries making up a plurality of individual batteries (battery pack) may be measured by conventional means, either individually or as connected in series. It will be appreciated that the power and capacity measurement may be made prior to connecting to respective manifolds.

Next, in step 305, if the electrode material is solid or partially solid, the electrode material may be heated, for example by resistive heating structures surrounding the battery cells and/or by introducing a heated liquid, such as a heated solvent into the battery cells through the fill (fluid-in) manifold e.g., 34A.

Next, in step 307, the liquid electrode material may then be removed from one or more of the battery cells substantially simultaneously e.g., by draining the liquid electrode material and/or by pumping a solvent or fresh liquid electrode material through the fill (fluid-in) manifold and into and through the individual battery cells to replace used liquid electrode material into the drain (fluid-out) manifold and subsequently out of the drain manifold. The removed liquid electrode material may be captured in a suitable container for subsequent recycling or resale.

Next, in step 309, following removal of the liquid electrode material, one or more fresh liquid electrode materials may be respectively introduced into one or more battery cells e.g., 14A, 14B, and 14C, from one or more liquid electrode material sources through the fluid-in manifold and thereafter substantially simultaneously into one or more of the battery cells. It will be appreciated that each of the battery cells associated with a battery pack (e.g., a plurality of battery cell type batteries arranged in series) may be refilled with the same or different liquid electrode materials.

It will also be appreciated that removal of the liquid electrode material in step 307 may take place in a separate step prior to introduction of fresh liquid electrode material and/or simultaneously with introduction of fresh liquid electrode material in step 309, e.g., where used liquid electrode material is at least partially displaced out of the respective battery cells upon introduction of fresh liquid electrode material. It will further be appreciated that introduction or flow of fresh liquid electrode material may optionally include an intermediate rinsing step or that introduction or flow of fresh liquid electrode material may take place for a period of time to substantially remove the used liquid electrode material. In one embodiment two liquid electrodes may be provided separated by an appropriate membrane and wherein both electrodes are refreshed at recharging time.

Next, in optional step 311, the respective battery cells may be tested (individually or together) in-situ prior to or following disconnection from the liquid electrode material sources to determine a power and capacity, e.g., including comparing to a baseline determined in step 303 to determine whether an individual battery and/or a plurality of the batteries are sufficiently recharged, e.g., that the power and/or capacity is greater than a predetermined threshold value.

In step 313, if it is determined that a battery and/or the plurality of batteries is not sufficiently recharged the process may began again at step 309 to introduce additional fresh electrode material, for example if the degree of recharge is less than a threshold value (not sufficiently close). It will be appreciated that battery testing may also occur following step 315, below.

Next, in step 315, if it is determined that the battery and/or the plurality of batteries are sufficiently recharged, the respective manifolds e.g., 34A and 34B and/or the liquid electrode material/solvent containers may be disconnected and the battery cells sealably closed.

It will be appreciated that connecting (e.g., step 301) and/or disconnecting (e.g., step 315) of respective manifolds and/or battery cell conduits may take place in a fully or partially inert gas atmosphere e.g., argon, and/or nitrogen, for example, where an inert gas may be blown onto (externally) and/or through respective connection inputs/outputs during connection and/or disconnection. For example, inert gas may be blown through a separate input/output in a respective manifold during disconnection of conduits from manifold inputs e.g., 18A, 18B, or 38A and 38. Additionally or alternatively, inert gas may be bubbled through the liquid electrode material within the battery cells to provide a positive pressure outflow at respective inputs/outputs as connecting conduits are being disconnected to prevent or minimized introduction of external air and water vapor into the battery cells.

It will be appreciated that the above recharge process, with the respective manifolds 34A, 34B and/or conduits 35A, 35B as part of the structure of an operating lithium ion battery bank, advantageously allows a battery recharge process to be carried out rapidly but conveniently, e.g., without removing, or with only partial removal the respective batteries and battery cells from an operating configuration, e.g., within an electric vehicle or other electric devices The lithium ion battery recharge techniques described herein may provide a substantial cost savings. It is envisioned that lithium ion batteries for use in electric or hybrid vehicles, in one exemplary usage, may be recharged and reused in an on-site facility while the vehicle owner waits. In another exemplary usage, the lithium ion battery pack may be removed from the vehicle and replaced with a new or recharged lithium ion battery pack, while the removed lithium ion battery pack may be serviced and rejuvenated for subsequent use, thus saving vehicle owners and manufactures substantial costs normally associated with replacement and/or warranties. Moreover, the liquid electrode recharge techniques of the exemplary embodiments may be utilized on other prismatic lithium ion batteries, including other battery cell type lithium ion batteries of differing configurations, and fall within the scope of the exemplary embodiments described herein.

The above description of embodiments of the invention is merely exemplary in nature and, thus, variations thereof are not to be regarded as a departure from the spirit and scope of the invention.

What is claimed is:

1. A method for recharging a lithium ion battery, comprising:
   providing a lithium ion battery comprising used liquid electrode material;
   removing said used liquid electrode material from said lithium ion battery; and,
   introducing a relatively unused or rejuvenated liquid electrode material into the lithium ion battery to replace the used liquid electrode material.

2. The method of claim 1, wherein said liquid electrode material comprises at least one of a negative or a positive electrode.

3. The method of claim 1, wherein said lithium ion battery comprises said liquid electrode material separated from a lithium or lithium alloy containing electrode by a non-liquid liquid electrolyte material.

4. The method of claim 3, wherein said non-liquid electrolyte material comprises at least one of a solid or a gel.

5. The method of claim 1, wherein said liquid electrode material is in a liquid state at a temperature within about plus or minus 10° C. of 21° C.

6. The method of claim 1, wherein said liquid electrode material is in a liquid state at a temperature within about plus or minus 20° C. of 21° C.

7. The method of claim 1, further comprising treating the used electrode material by at least one of a chemical or electrochemical process to rejuvenate said liquid electrode material to a relatively unused state.

8. The method of claim 1, further comprising treating the used electrode material by at least one of a chemical or electrochemical process to either restore or remove lithium.

9. The method of claim 1, wherein the step of removing said used liquid electrode material comprises draining said used liquid electrode material from said battery.

10. The method of claim 1, wherein the step of removing said used liquid electrode material comprises pumping out said used liquid electrode material from said battery.

11. The method of claim 1, wherein the step of introducing a relatively unused liquid electrode material comprises pumping said relatively unused liquid electrode material into said battery.

12. The method of claim 1, wherein said lithium ion battery comprises one battery cell of a plurality of battery cells stacked together and electrically connected in series.

13. The method of claim 1, wherein said lithium ion battery comprises a power source for one of an electric and hybrid vehicle.

14. The method of claim 1 further comprising determining one of a power and a capacity of said lithium ion battery prior to the step of removing and following the step of introducing.

15. A method for recharging a lithium ion battery, comprising:
   providing a lithium ion battery comprising used liquid electrode material, said liquid electrode material separated from a lithium or reversible lithium storage material containing electrode by a non-liquid electrolyte material;
   removing said used liquid electrode material from said lithium ion battery; and, introducing a relatively unused liquid electrode material into the lithium for battery to replace the used liquid electrode material.

16. The method of claim 15, wherein said liquid electrode material comprises one of a negative electrode or a positive electrode.

17. The method of claim 15, wherein said non-liquid electrolyte material comprises at least one of a solid or a gel.

18. The method of claim 15, wherein said liquid electrode material is in a liquid state at a temperature within about plus or minus 10° C. of 21° C.

19. The method of claim 15, wherein said liquid electrode material is in a liquid state at a temperature within about plus or minus 20° C. of 21° C.

20. The method of claim 17, further comprising treating the used electrode material by at least one of a chemical and/or electrochemical process to restore said liquid electrode material to a relatively unused state.

* * * * *